(12) United States Patent
Druzynski et al.

(10) Patent No.: US 6,686,947 B2
(45) Date of Patent: Feb. 3, 2004

(54) RECORDING A DIGITAL IMAGE OF A DESIRED APERTURE FORMAT AND RESOLUTION ONTO MOTION PICTURE PHOTOSENSITIVE MEDIUM

(75) Inventors: Richard L. Druzynski, East Rochester, NY (US); Martin E. Oehlbeck, Rochester, NY (US); Rockwell N. Yarid, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 74 days.

(21) Appl. No.: 10/121,422

(22) Filed: Apr. 12, 2002

(65) Prior Publication Data

US 2003/0193556 A1 Oct. 16, 2003

(51) Int. Cl.$^7$ .................................................. B41J 2/47
(52) U.S. Cl. ...................................................... 347/239
(58) Field of Search .......................... 347/239, 225, 347/251, 240, 123, 127; 399/1, 2, 4, 5

(56) References Cited

U.S. PATENT DOCUMENTS

| | | | |
|---|---|---|---|
| 6,016,157 A | | 1/2000 | Stephenson |
| 6,037,973 A | | 3/2000 | DiGiulio et al. |
| 6,111,671 A | * | 8/2000 | Bahuguna et al. |
| 6,130,740 A | | 10/2000 | DeClerck et al. |
| 6,215,547 B1 | | 4/2001 | Ramanujan et al. |
| 6,330,018 B1 | | 12/2001 | Ramanujan et al. |

OTHER PUBLICATIONS

"A Realtime Pin–Registered TeleScanner" by Edmund DiGiulio et al., SMPTE vol. 107, No. 8, Aug. 1998.

* cited by examiner

*Primary Examiner*—Raquel Yvette Gordon
(74) *Attorney, Agent, or Firm*—Raymond L. Owens

(57) ABSTRACT

A method for receiving digital images from a digital image file and recording corresponding visual images onto a motion picture photosensitive medium includes receiving information related to the image aperture format and image type positive or negative of the digital images to be recorded on the motion picture photosensitive medium.

8 Claims, 5 Drawing Sheets

RECORDING A DIGITAL IMAGE OF A DESIRED APERTURE FORMAT AND RESOLUTION ONTO MOTION PICTURE PHOTOSENSITIVE MEDIUM

FIELD OF THE INVENTION

The present invention relates to a method for receiving digital images from a digital image file and recording corresponding visual images onto a motion picture photosensitive medium.

BACKGROUND OF THE INVENTION

Digital images can be printed on a photosensitive medium by a system that uses a two-dimensional optical modulator such as a reflective liquid crystal display (LCD). Systems that utilize two-dimensional optical modulators to print digital images to a photosensitive medium are the subject of U.S. Pat. Nos. 6,016,157 and 6,130,740. The digital image presented on the modulator is optically focused on the motion picture photosensitive medium and a source or sources of light is allowed to illuminate the modulator, which then creates a latent image frame on the motion picture photosensitive medium. Common types of photosensitive medium manufactured by the Eastman Kodak Company, for example, used by the motion picture industry is of a fixed width such as 16 mm, 35 mm, or 65 mm and variable length according to the number of images contained on it. In addition there are, in the most common types, a series of perforation holes on each side of the motion picture photosensitive medium along it's length. A series of related image frames printed on this type of motion picture photosensitive medium in a specific sequence, which differs slightly in image content in a predetermined manner, will produce the visual sensation of movement when projected on a movie screen. This is the method used for over 90 years to project movies in theaters worldwide.

The size and location of the image frame on the motion picture photosensitive medium used to project a movie is defined in the standards published by the Society of Motion Picture Television Entertainment (SMPTE 59-1998). The three most common motion picture photosensitive media in use today are the 16, 35, and 65 mm formats, the most common of which is the 35 mm format. The size of the image frame on the motion picture photosensitive medium is referred to as the aperture image area by the Standards. Over the last 90 years the structure of aperture areas have been defined. Today the most common type used are 35 mm Style C and 35 mm Style A. The motion picture industry commonly refer to the Style C as a Full Aperture frame and the 35 mm Style A as an Academy Aperture frame. The Standard's definition of aperture image area deals with the length, width, location and orientation of the frame on the motion picture photosensitive medium.

An added variable to the size and location of the frame on the motion picture photosensitive medium is that the digital image can be printed on the motion picture photosensitive medium as either a positive or a negative image. A positive image is representative of a true image wherein a true image representation is one that is easily recognized as having colors and variation in densities that one would observe or expect to see in a real life setting. A negative image is generally understood to be an image where the density and colors are the opposite of the true image, that is high densities on the negative image will be represented by low densities on the positive image and visa versa. In addition the primary colors red, green, and blue in a positive image will most often be represented by cyan, magenta, and blue respectively in a negative image.

The process of creating a full feature motion picture may involve a number of steps in which negative images on the motion picture photosensitive medium (master) are used to optically create positive images on another motion picture photosensitive medium (receiver), and positive images are used to optically create negative images, and so on. This optical printing process has been in use by film processing laboratories throughout the world for as long as the motion picture industry has been in existence. In this optical printing process, the master and receiving motion picture photosensitive media are placed with the emulsion surfaces of each in contact with the other. A source of light is used to expose and create a latent image of the master image on the receiving motion picture photosensitive medium. Because the emulsion surfaces have to face each other, the image between a master and a receiver (when viewed from the emulsion side of the motion picture photosensitive medium) have to be oriented opposite to each other in one dimension transverse to the length of the motion picture photosensitive medium. The digital images created by a two-dimensional optically modulated printer will have to be placed in the proper orientation and location on the motion picture photosensitive medium in accordance with the image types positive or negative.

A two-dimension optical modulator, such as a LCD modulator, used in a digital image printer has a fixed two-dimensional image bearing area. Not only are the two dimensions fixed in size but the resolution is also fixed in size. The resolution is generally defined as the number of independently variable picture elements or pixels that are contained within the fixed area of the modulator. As was stated, the image bearing plane of the modulator is optically focused onto the motion picture photosensitive medium in order to create an image. It is desirable that the entire image bearing area of the modulator be optically focused and dedicated to the creation of an image of a specific aperture type in order to produce the highest possible resolution and quality. The images created for use by the motion picture industry are among some of the highest resolution images created today.

A 35 mm Academy Aperture frame does not use the entire area available for images on the motion picture photosensitive medium, as does a Full Aperture. A negative 35 mm Academy Aperture image frame center point is not aligned to the center point of the available image area, in the dimension between the perforations, on the motion picture photosensitive medium when the image is printed as is defined by the SMPTE standards 59-1998. The offset of the center points between the image frame and the motion picture photosensitive medium is in the opposite direction for a negative as it is for a positive.

In order to have the flexibility to print positive and negative images using the entire available area on the LCD modulator, there must be the proper alignment of the image frame on the motion picture photosensitive medium be provided. A number of methods have been considered, each having benefits and drawbacks. As an example, the total available image area on the modulator could be optically focused on the motion picture photosensitive medium such that it covers the entire available image area on the motion picture photosensitive medium (see U.S. Pat. No. 6,130, 740). This method provides the ability to print all aperture types as well as positives and negatives, but the cost can be a loss of resolution when printing an image smaller than the full aperture because only a part of the modulator's area can be used for imaging. This is a waste of valuable imaging area and a loss in resolution. Yet another way of providing for the need to print positive and negative images can be to have a fixed focus optical system, and the ability to positionally aim this optical system on the motion picture photosensitive medium. Moving an optical system is practical but less desirable than that which is disclosed in the present invention.

SUMMARY OF THE INVENTION

It is therefore an object of the present invention to provide a way that minimizes the above noted problems by using two-dimensional optical modulators to effectively record digital images onto a motion picture photosensitive medium while, at the same time, meeting the requirements of the prevailing Standards.

Another object of the present invention is to provide a printer, designed and optimized to print an Academy Aperture, to print both positive and negative images.

These objects are achieved by a method for receiving digital images from a digital image file and recording corresponding visual images onto a motion picture photosensitive medium, comprising the steps of:

a) receiving information related to the image aperture format and image type positive or negative of the digital images to be recorded on the motion picture photosensitive medium;

b) providing at least one two-dimensional optical modulator disposed in an image transfer relationship with the motion picture photosensitive medium and having a predetermined number of pixels such that when the two-dimensional optical modulator is activated, visual images are produced;

c) optically focusing a visual image to be produced by the two-dimensional optical modulator to be recorded onto the motion picture photosensitive medium;

d) sequentially positioning the motion picture photosensitive medium in the image transfer relationship with the modulator's image plane;

e) secondarily positioning the position of a visual image to be recorded by providing relative movement between the motion picture photosensitive medium and the optical modulator in a direction transverse to the length of the motion picture photosensitive medium and at a position required to position a visual image in accordance with the image aperture format and image type positive or negative of the corresponding digital image; and f) responding to the digital image file to activate the two-dimensional optical modulator to provide the visual image which represents the digital image or an image plane of the digital image to be recorded so that the motion picture photosensitive medium will record a selected positive or negative visual image in the appropriate position without reduction of the number of pixels provided by the modulator.

It is a feature of the present invention to use a two-dimensional optical modulator, such as an LCD, in an effective manner to convert a digital image from a digital image file into a visual image and to record such visual image at the appropriate position on a motion picture photographic medium in accordance with Standards while maintaining maximum image resolution.

The use of a two-dimensional optical modulator, such as that which is disclosed in U.S. Pat. No. 6,330,018, in conjunction with the ability to move the motion picture photosensitive medium relative to the fixed optically focused image or move the modulator relative to the fixed position of the motion picture photosensitive medium or moving both the modulator and the motion picture photosensitive medium provides the ability to align the image more easily on the motion picture photosensitive medium that is required by the Standards. This provides the ability for a system to print Full Aperture, Academy Aperture positive or negative images. In a system that needs only to print Academy Aperture, the variable magnification optics could be replaced with a fixed magnification optics thereby simplifying the design.

DETAILED DESCRIPTION OF THE INVENTION

Figure 1:
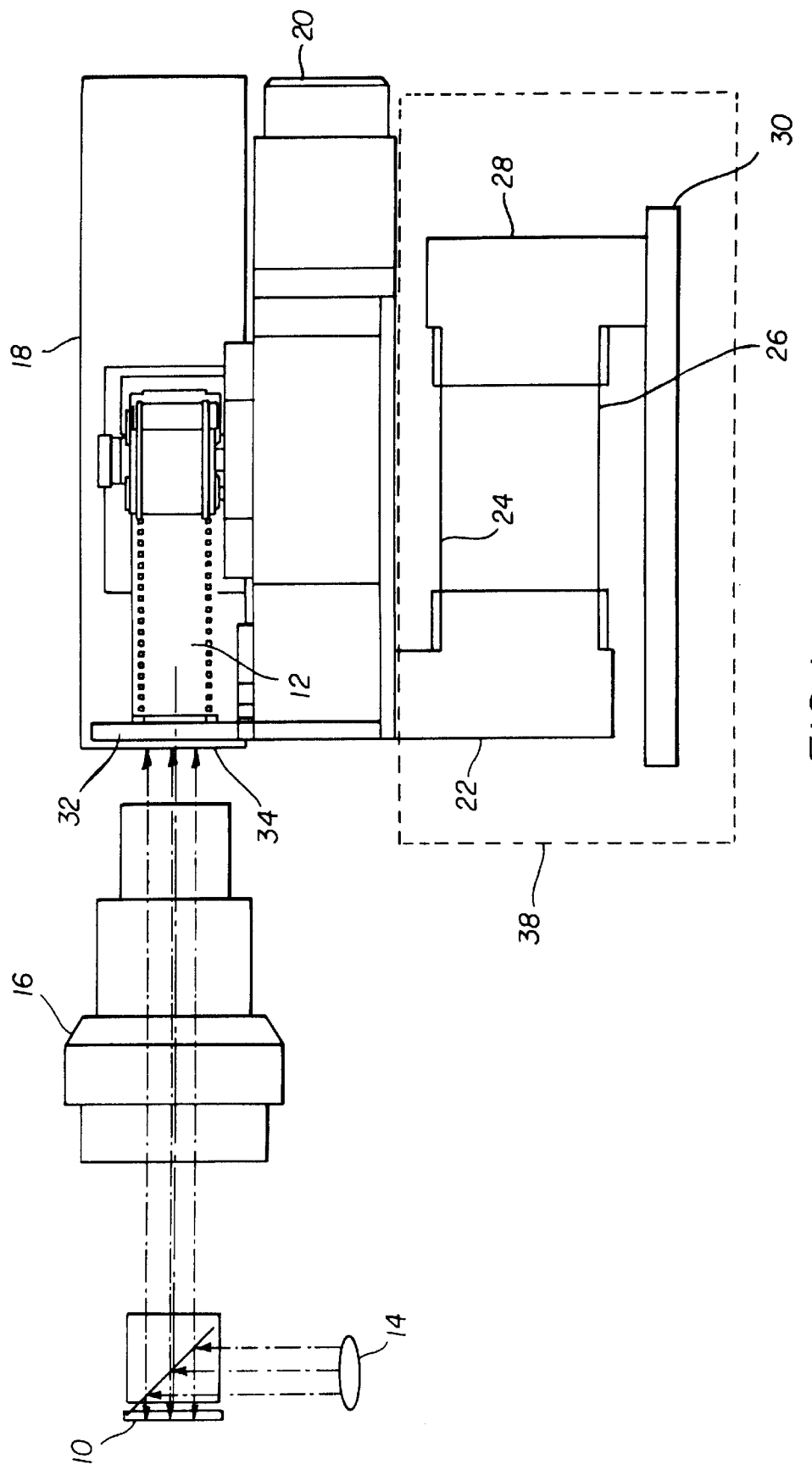
FIG. 1 depicts a portion of an optical system and media transport mechanism for a two-dimensional optical modulator printer system.

FIG. 1 is a partial view of the optical and media transport mechanism used in a digital image printer. Such printers are disclosed in U.S. Pat. Nos. 6,215,547 and 6,330,018. Turning now to FIG. 1, an area array liquid crystal display (LCD) is used as a two-dimensional optical modulator 10. An area type reflective liquid crystal display or LCD is one such type of a two-dimensional optical modulator. The digital image is presented to form a visual image on the two-dimensional optical modulator 10. If the motion picture photosensitive medium 12 is of the monochromatic type, commonly called black and white film, it will only have one monochromatic color image plane or emulsion layer. Information in a digital image file is organized or encoded to provide a record corresponding to a particular color image plane. For black and white motion picture photosensitive medium there will be only one color record. If the motion picture photosensitive medium 12 is a color medium, then the digital image file will typically contain three color records and the motion picture photosensitive medium will, typically, have three monochromatic color emulsion layers or planes. For a printer system that employs a single two-dimensional optical modulator 10, a color image can only be printed by sequentially presenting each of the visual color images created by the associated color records in the digital image file onto the motion picture photosensitive medium. Each of the color planes from the associated color record is superimposed on each other at the motion picture photosensitive medium. In a printer system employing multiple two-dimensional optical modulators, the color records can be presented to each of the two-dimensional optical modulators, as is available, simultaneously while optically combining and focusing the visual images provided by each modulator into a single visual image and recording such visual image onto the photosensitive medium.

Once the digital image is presented on the two-dimensional optical modulator 10 an illumination source 14 is then enabled to create a visual image which is then optically focused at the image plane 34 on the motion picture photosensitive medium by the imaging optics 16. The imaging optics 16 is a telecentric optical system that is designed to provide a specific magnification (variable or fixed) and ability to focus the visual image from the two-dimensional optical modulator on the image plane 34. The motion picture photosensitive medium is positioned at the image plane 34. The illumination source 14 could contain more than one color light source, each at a different wavelength, as is required by the type of medium that is being used. Such an illumination source is described in U.S. Pat. No. 6,215,547. Typically, an illumination source with three different wavelengths of approximately 680 nm, 530 nm, and 445 nm can be used with negative stock color motion picture photosensitive medium. Such different colors might be generated by light emitting diodes (LED) sources, laser sources, or white light filtered to pass specific colors. The selection of wavelengths can be dependent on the peak sensitivity of the emulsion layers in the motion picture photosensitive medium and available sources of light. Each color light source in the illumination source 14 is independently controlled in order to precisely produce the proper densities and colors of the image on the motion picture photosensitive medium. The source of illumination is controlled in a time dependent sequence and duration synchronous with the color records in the digital image file when presented to the LCD modulator. Such control involves controlling the duration in time that each color light source is turned on and emitting light and controlling the light output power or intensity of the color light source on the medium. This combination of controlling time and light power at the motion picture photosensitive medium is referred to as the exposure level. Once the image has been exposed on the motion picture photosensitive medium, a new unexposed frame needs to be brought into the focused image plane in order to create the next image. The science of creating color or black and white images on photosensitive medium is well documented in such publications as "Eastman Professional Motion Picture Films", Kodak Publication No. H-1.

Figure 2:
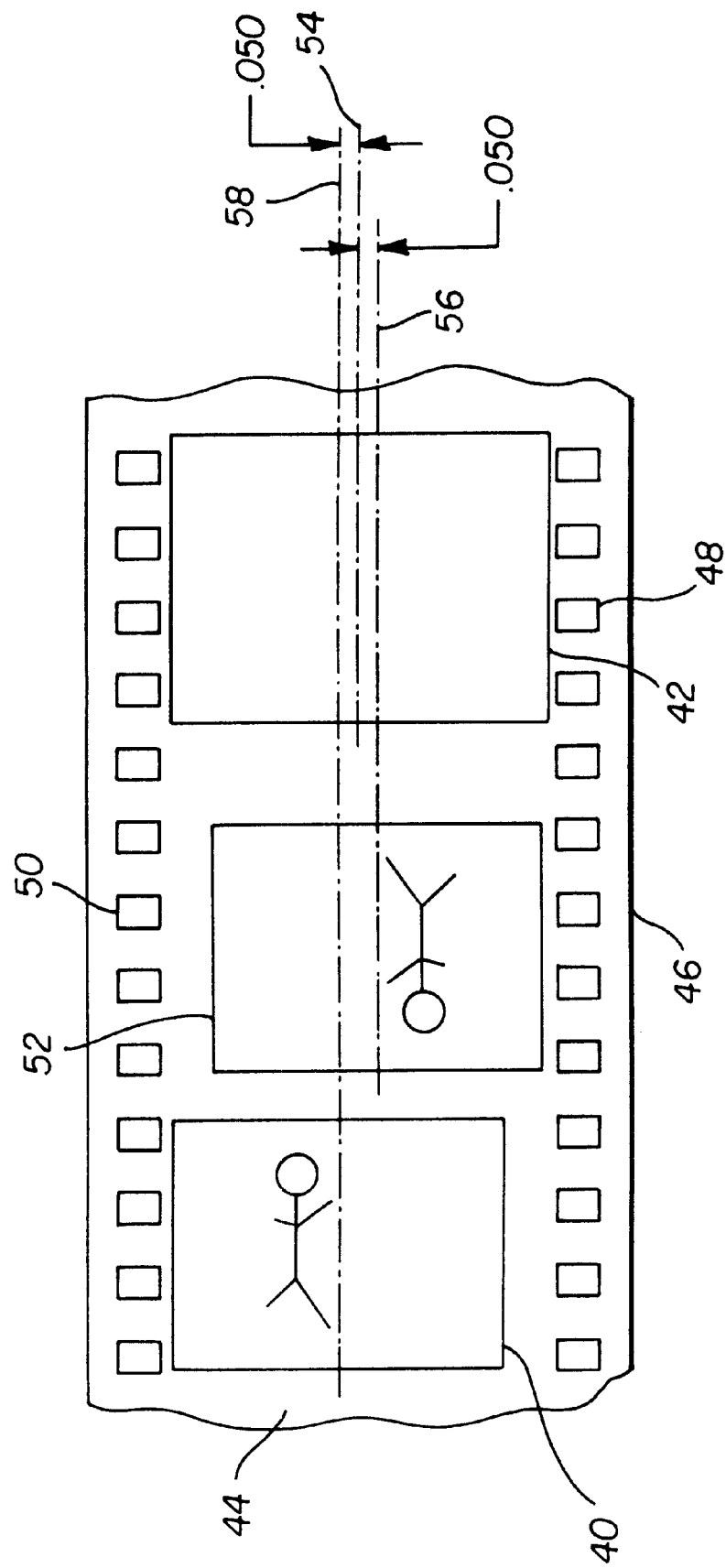
FIG. 2 depicts a portion of the Standards 59-1998 for 35 mm Academy and Full Aperture formats with critical positive and negative image positions.

Turning now to FIG. 2, the SMPTE Standard SMPTE 59-1998 defines two aperture image areas as Style A 40 and Style C 42 to be used on 35 mm motion picture photosensitive medium 44. The orientation of the images as shown in FIG. 2 is viewed from the emulsion side and with the reference edge 46 of the motion picture photosensitive medium at the bottom. The specific photosensitive medium used for recording movies have a series of perforations 48, 50 along the length on both edges of the motion picture photosensitive medium. There are some media that have only a series of perforations on one side, but the most common types have two series of perforations. The present invention works equally as well with either type. Both Style A and Style C apertures are commonly referred to in the industry as an Academy Aperture and a Full Aperture respectively. The placement of a negative Academy Aperture can be accommodated within the defined area of a Full Aperture 42. The placement of the negative aperture imaging area is specified relative to the perforations and edges of the film. The placement of the frame within the defined aperture image area between the perforations is of primary importance to the present invention. It is assumed that the placement of the image frame along the direction of the length of the film is not affected, beyond the limits of tolerance, by the methods and apparatus presented in the present invention.

A positive like image is often printed on negative film stock and is referred to as an interpositive image which is generally used to make dupnegatives. The placement of a positive Academy Aperture image frame 52 is within the Full Aperture area 42. The Full Aperture is centered on the centerline 54 of the motion picture photosensitive medium 44. The centerline alignment 56 of the positive frame 52 is symmetrical, and opposite to the centerline alignment 58 of a negative frame 40 relative to the centerline 54 of the full available image area on the motion picture photosensitive medium 44. There is no change in alignment along the length of the motion picture photosensitive medium for a positive or negative frame.

One method of providing the desired displacement of the focused image plane relative to the motion picture photosensitive medium in creating a negative or positive Academy Aperture frame can be to move the two-dimensional optical modulator 10 in a desired direction to displace the image.

Figure 3C:
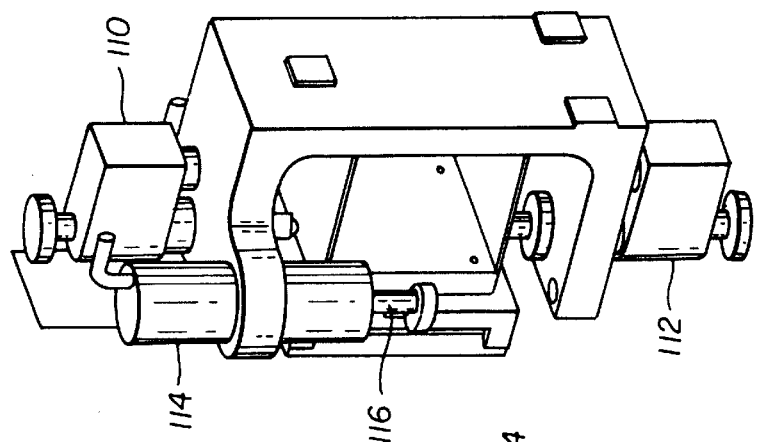
FIGS. 3A, 3B, and 3C depict different perspective views of a flexure mechanism for holding and positioning an LCD modulator.
Figure 3B:
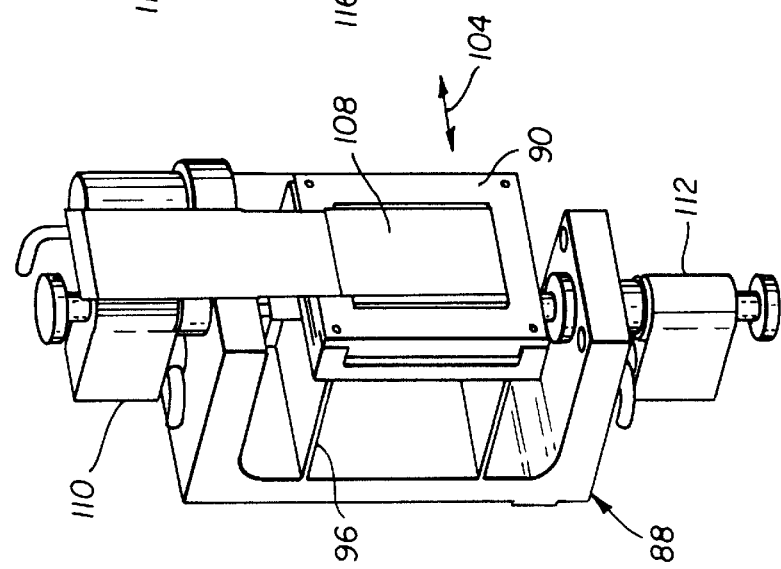
Figure 3A:
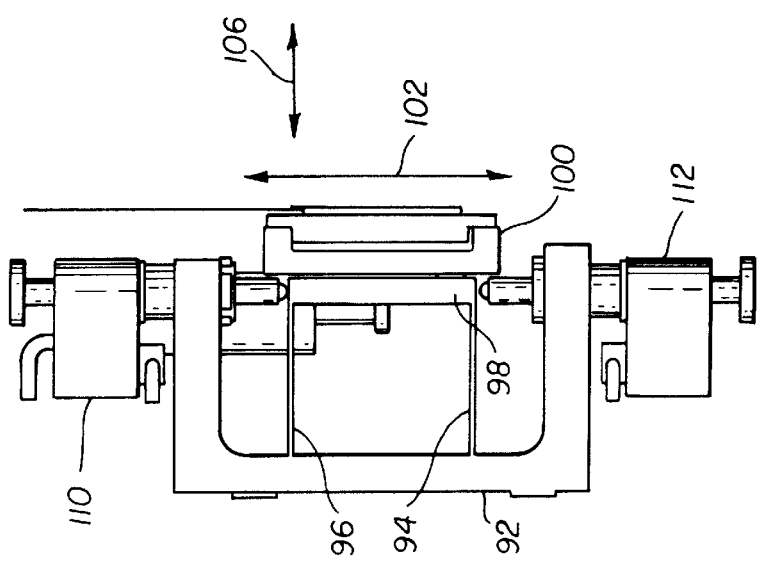

FIGS. 3A, 3B, and 3C show three perspective views of a flexure mechanism 88 on which is attached the LCD assembly 90. The flexure mechanism 88 is composed of several components: housing 92; spring flexures 94; spring flexure 96; LCD base mount 98; and LCD carrier 100. The LCD assembly 90 is attached to the LCD carrier 100. The spring flexures 94 and 96 are made of spring steel which can be made to bend thereby causing the LCD base mount 98 and all components and assemblies attached to it to also move. The spring flexures will only move in one desired direction 102 (see FIG. 3A) about a neutral position while maintaining a fixed position in the transverse direction 104 (see FIG. 3B). As the LCD assembly 90 is displaced in the desired direction 102, the image bearing surface 108 of the LCD assembly 90 will remain parallel to the plane created by the image bearing surface 108 while it is in a neutral position. The neutral position is the position of the LCD assembly when the spring flexures 94 and 96 are at rest. There will be a displacement in the direction normal 106 (see FIG. 3A) to the image bearing surface 108 of the LCD assembly 90. This displacement will not be a problem if the application and design of this type of system is carefully considered. Focus depth and other potential optical distortions must be considered which, in turn, will affect the optimal length of the spring flexures 94 and 96 as well as the design of the imaging optics 16.

The way of driving the LCD assembly 90 to different positions in the desired direction 102 can be provided by a number of different components or mechanisms well known in the art. Such mechanisms consist of, but are not limited to, motor driven precision ball screw positioners 110 and 112 attached to the housing 92 of the flexure mechanism 88. Each ball screw positioner drives the LCD assembly in opposite directions from its neutral or at rest position. This provides a single point contact force between the LCD base mount 98 and each positioner, which reduces friction and wear and provides for a more precise movement. This, however, is not the only method of coupling such mechanisms.

The magnitude and direction of the displacement of the LCD assembly 90 by the positioners 110 and 112 can be under the control of a computer, not shown, attached to appropriate motor or actuator drivers. These types of devices, precision ball screws, motors, and motor drivers can be purchased on the worldwide commercial market from manufacturers such as New Focus Inc. Feedback control for precise positioning can be provided by a linearly variable differential transformer (LVDT) 114 (see FIG. 3C) which can be attached to the housing 92. The armature or measuring head 116 of the LVDT 114 can be in contact with the LCD base mount 98. The LVDT 114, computer control (not shown), and positioner can constitute a closed loop servo controlled system which practically can have positional resolutions in the submicron range.

The flexure mechanism 88, as well as the LCD assembly 90, can replace the two-dimensional optical modulator 10 shown in FIG. 1. The flexure mechanism 88 and the LCD assembly 90 can be oriented such that the desired motion 102 is in a direction required to align the image on the motion picture photosensitive medium in accordance with the Standards.

Figure 4:
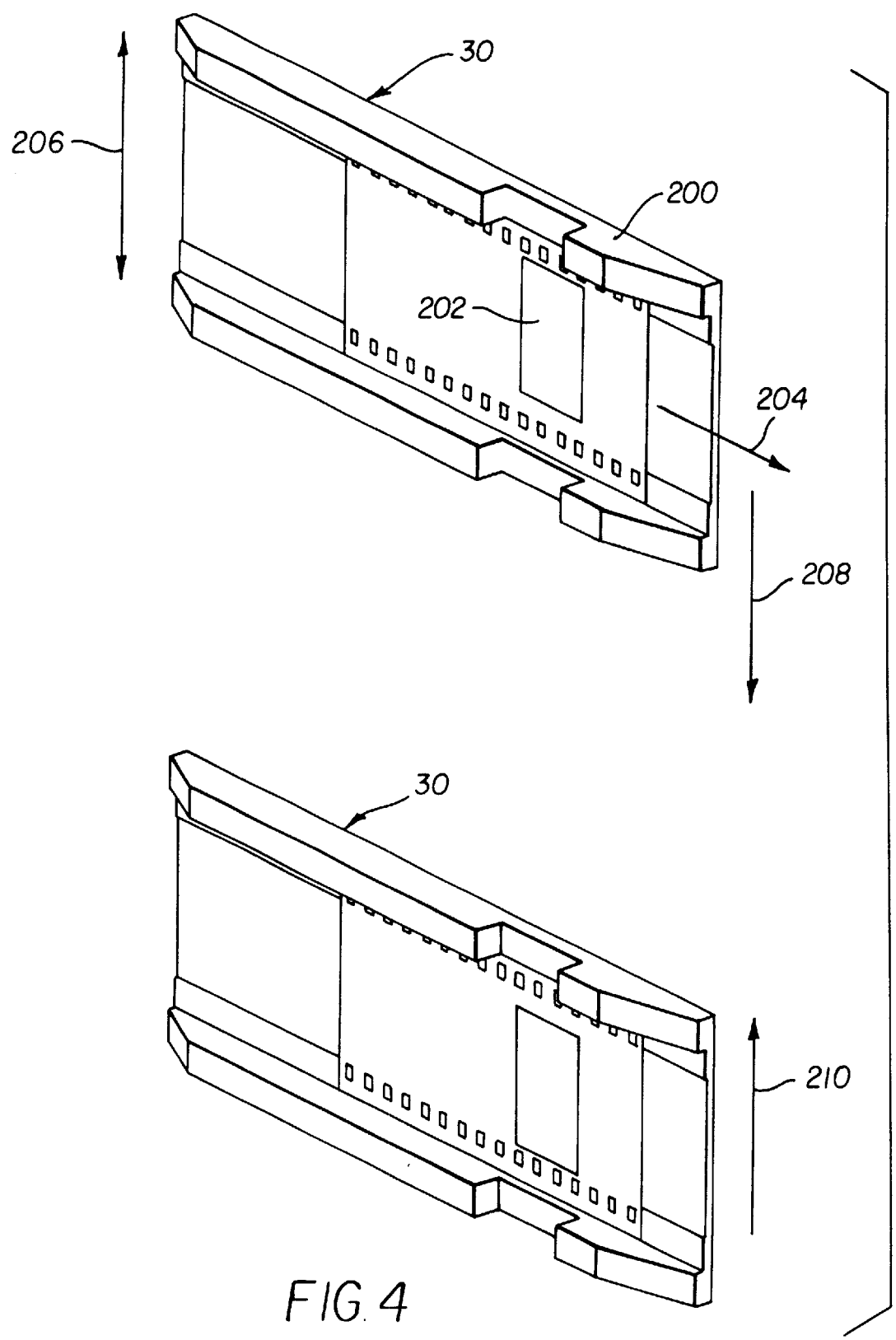
FIG. 4 depicts a component of the film gate shown in FIG. 1, which is a part of the media transport mechanism, used to position and clamp the motion picture photosensitive medium at the focused image plane.

Yet another embodiment for aligning the image on the medium is shown in FIG. 4, which shows a component of the film gate 32 called the film gate base plate 200. The film gate base plate 200 supports and provides precision registration of the motion picture photosensitive medium when clamped in place (clamp not shown) to the base plate. The motion picture photosensitive medium is held in place at the image plane 34 by clamps not shown. A full fitting pin (not shown) is inserted into a perforation 50 on the motion picture photosensitive medium in order to align the medium at the image plane 34. Once the medium is aligned, a clamp holds the medium. Such an apparatus is the subject matter of U.S. Pat. No. 6,037,973 and technical paper published in the SMPTE Journal, Volume 107, Number 8, August 1998; Authors: Edmund DiGiulio and James Bartell, wherein is disclosed the method, apparatus, application, and control of a high speed precision film transport system used to transport the type of medium which is of primary interest to the present invention. The imaging surface of the motion picture photosensitive medium 202 will be at the image plane 34 in an image transfer relationship with the two-dimensional optical modulator 10. The base plate 200 holds the motion picture photosensitive medium flat and at rest while the modulator and illumination source(s) are activated to create a visual image. The resulting visual image will create on the motion picture photosensitive medium a latent image. After the printing cycle is complete for a specific image frame, the film gate will convey the motion picture photosensitive medium in a direction along it's length 204 exactly one frame to bring an unexposed area of the motion picture photosensitive medium within the image plane 34 so that another image can be printed. In the case of a 35 mm Academy Aperture frame, the film gate can convey the motion picture photosensitive medium a distance of four perforations to place a new image frame in position. The film gate can be driven and controlled by a number of different ways such as motors and computerized controllers. Such mechanisms are readily available from a number of worldwide manufacturers of motion systems such as GaIil Inc. and Danaher Motion System Inc.

As shown in FIG. 1, the film gate 32 is part of a system that includes the means for storing fresh unexposed medium called the film cassette 18 and the yet another film cassette, not shown, for storing the motion picture photosensitive medium that has latent images printed at the film gate. The motion picture photosensitive medium is transported from a supply film cassette 18 to the take-up film cassette (not shown). The entire assembly consisting of the film gate 32, film cassettes 18 (only one shown), and associated drive assembly 20 is called the media transport mechanism 36. In order to provide for alignment of the image on the motion picture photosensitive medium in accordance with the Standards, a relative motion between the motion picture photosensitive medium and the optical modulator must be provided by moving the motion picture photosensitive medium in a direction transverse to the length of the photosensitive medium. The media transport mechanism can be mounted in such a way as to enable movement of the entire mechanism such that the film gate can be displaced in a desired direction 208 and 210 which is transverse to the length of the motion picture photosensitive medium. This desired movement of the transport mechanism is controlled by the flexure assembly 38. Components of the flexure assembly are drive mount 22, spring flexures 24 and 26, base mount 28, and base plate 30. The flexure assembly 38 is very similar in design and action to that described for the flexure assembly 88 used in positioning the LCD assembly 90 of FIGS. 3A, 3B, and 3C. The motion in the desired direction 208 and 210 of the motion picture photosensitive medium is relative to the image area 202 at the motion picture photosensitive medium, which is at the image plane 34. The relative motion between the motion picture photosensitive medium and the optical modulator is accomplished by moving the drive mount 22. Two spring flexures 24 and 26 are made of spring steel, which will allow movement in one direction. This direction is the desired direction 208 and 210 for moving the film gate base plate 200 shown in FIG. 4. The base mount 28 of the flexure assembly 38 is mounted to a base plate 30 that is fixed for all other components of the system.

The same undesirable displacement normal to the focused image plane does occur in this assembly. This undesired displacement could result in an image focus problem on the motion picture photosensitive medium if the displacement exceeds the allowable depth of focus at the focused image plane. The depth of focus, magnitude of displacement, and flexure length are general first order parameters that must be considered in the design and application of this apparatus. The motivating force for the flexure assembly 38 can be supplied by the same type of components described for the flexure 88 shown in FIGS. 3A, 3B, and 3C on which the LCD assembly 90 is mounted.

The relative motion between the motion picture photosensitive medium and the optical modulator can be accomplished by moving both the motion picture photosensitive medium and the optical modulator. Using both flexure assemblies described, the LCD assembly and the media transport mechanism, to displace the image at the image plane can result in less total displacement by each assembly to align the image frame. This, in turn, can minimize or eliminate the practical effects that the undesired displacement can have on the image.

Figure 5:
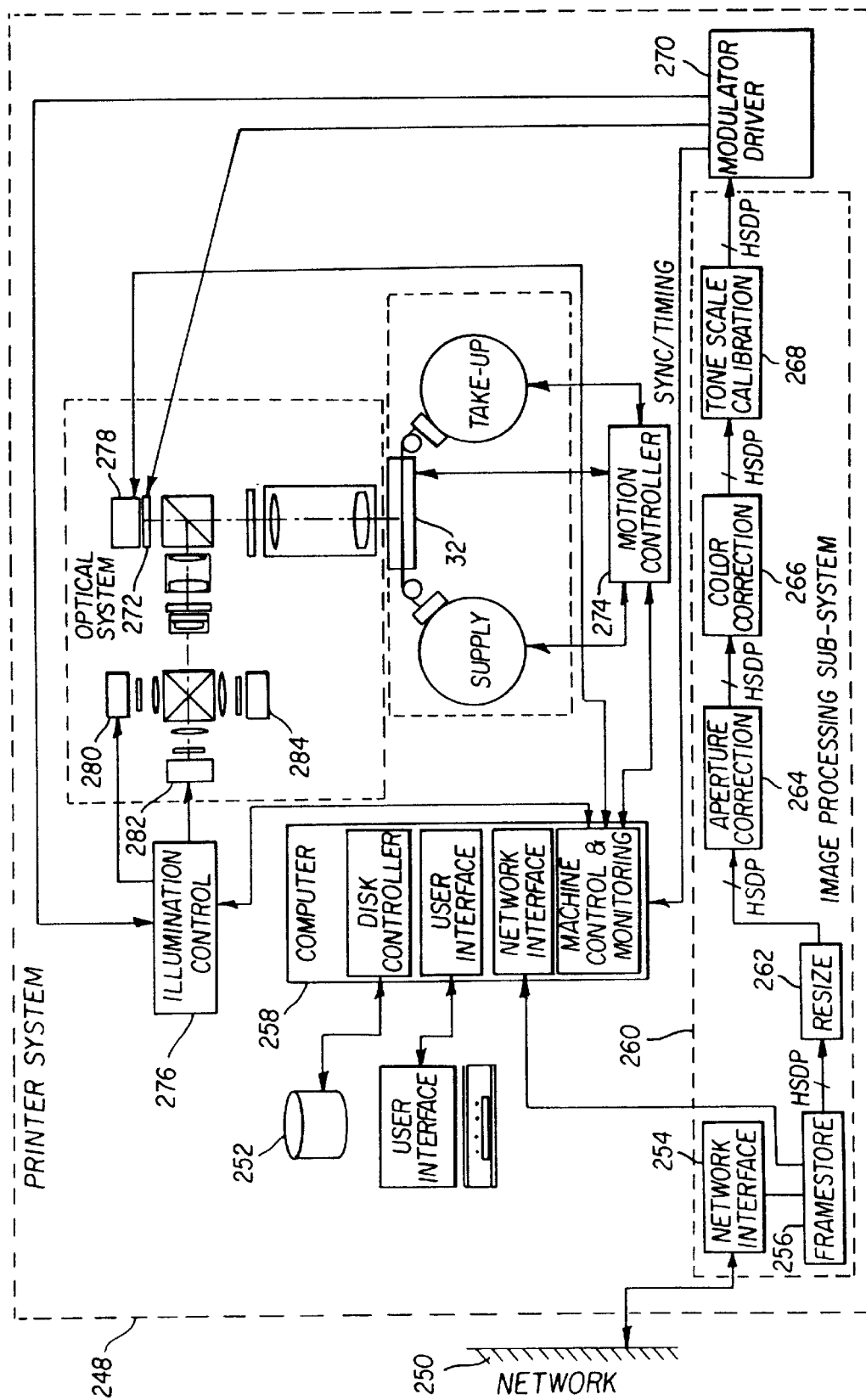
FIG. 5 shows a printer system comprising a single two-dimensional optical modulator.

FIG. 5 is a system view of a two-dimensional optical modulator motion picture printer. Turning now to FIG. 5, digital image data located on an external network storage means 250 enters a printer system 248 by means of the network interface 254 and then into the framestore 256 memory. Digital image data can also be stored on an internal computer's 258 storage means 252 and be made available to the framestore 256 memory. The framestore 256 is a component of the image processing subsystem 260, which could be located in the internal computer 258. The image processing subsystem 260 could be a high speed digital signal processing board called a reconfigurable computing engine available from Annapolis Micro System of Annapolis, Md. in the U.S. The board is based on high speed field programmable gate array (FPGA) processing elements, random access memory (RAM), and supporting logic circuits which can be programmed to perform a host of logic and mathematical functions. One such function is the retrieval and storage of digital image data, such a function is called a framestore. Once data is loaded into the framestore 256 it can be processed by a number of other elements of the image processing subsystem 260 according to the needs of the user. Examples of processing activities that might be performed can involve image resizing 262, aperture correction 264, color correction 266, and tone scale calibration 268 to name a few. These functions are know in the art and can be found in many publications.

Once the image has been preprocessed it is made available to the modulator driver 270 to be presented to the two-dimensional optical modulator 272. Prior to the commencement of printing the image and the resulting movement of digital images from the storage means to the printer, the user can supply a job description to the printer system 248 through a suitable user interface on the internal computer 258. The job description can supply, but not be limited to, information on the storage location of digital images to be printed, the number of images to be printed, the image processing that needs to be performed on the images by the image processing subsystem, the exposure levels, image aperture format, and image type positive or negative. With respect to the image type positive or negative, the internal computer 258 can translate the user's information and command the drive assembly 20 and/or the motor driven precision ball screw positioners 110 and 112 to properly align the motion picture photosensitive media, and hence the image plane 202 in the required direction and magnitude as can be required by the Standard.

One or more digital color record from a digital image file is presented to the modulator driver 270 by the image processing subsystem 260 in sequence. The digital image file will activate the two-dimensional optical modulator to provide the visual image which represents the digital image or an image plane of the digital image to be recorded so that the motion picture photosensitive medium will record a selected positive or negative visual image in the appropriate position without reduction of the number of pixels provided by the modulator. This color dependent digital image data is presented to the modulator 272 by the modulator driver 270. Once the image data presented to the modulator is stable, the modulator driver 270 will command the illumination control 276 to turn on the appropriate color light source (red 280, green 282, blue 284) for a specific duration of time as programmed by the user. The light output power level for each light sources 280, 282, and 284 can be pre-set by the internal computer 258 to a specific power output level or intensity prior to printing an image. The specific color light source can not, however, turn on until it was enabled by the modulator driver 270. Each color record of a digital image file is presented to the two-dimensional optical modulator 10 in a time dependent sequence synchronous with enabling each of the respective light sources 280, 282, and 284 which is controlled by the modulator driver 270.

The invention has been described in detail with particular reference to certain preferred embodiments thereof, but it will be understood that variations and modifications can be effected within the spirit and scope of the invention.

PARTS LIST 10 two-dimensional optical modulator
12 motion picture photosensitive medium
14 illumination source
16 imaging optics
18 film cassette
20 drive assembly
22 drive mount
24 spring flexures
26 spring flexures
28 base mount
30 base plate
32 film gate
34 image plane
36 media transport mechanism
38 media transport flexure assembly
40 negative frame
42 Full Aperture
44 motion picture photosensitive medium
46 reference edge
48 perforations
50 perforations
52 Academy Aperture image frame
54 centerline
56 positive frame centerline
58 negative frame centerline
88 flexure mechanism
90 LCD assembly
92 housing
94 spring flexures PARTS LIST (con't)

96 spring flexures
98 LCD base mount
100 LCD carrier
102 desired direction
104 transverse direction
106 direction normal
108 image bearing surface
110 ball screw positioners
112 ball screw positioners
114 linearly variable differential transformer (LVDT)
116 armature or measuring head
200 film gate base plate
202 motion picture photosensitive medium/image plane
204 length
208 desired direction
210 desired direction
248 printer system
250 external network storage means
252 storage means
254 network interface
256 framestore
258 internal computer
260 image processing subsystem
262 image resizing
264 aperture correction
266 color correction
268 tone scale calibration
270 modulator driver PARTS LIST (con't)

272 two-dimensional optical modulator
276 illumination control
280 color light source (red)
282 color light source (green)
284 color light source (blue)

What is claimed is:

1. A method for receiving digital images from a digital image file and recording corresponding visual images onto a motion picture photosensitive medium, comprising the steps of:

a) receiving information related to the image aperture format and image type positive or negative of the digital images to be recorded on the motion picture photosensitive medium;

b) providing at least one two-dimensional optical modulator disposed in an image transfer relationship with the motion picture photosensitive medium and having a predetermined number of pixels such that when the two-dimensional optical modulator is activated, visual images are produced;

c) optically focusing a visual image to be produced by the two-dimensional optical modulator to be recorded onto the motion picture photosensitive medium;

d) sequentially positioning the motion picture photosensitive medium in the image transfer relationship with the modulator's image plane;

e) secondarily positioning the position of a visual image to be recorded by providing relative movement between the motion picture photosensitive medium and the optical modulator in a direction transverse to the length of the motion picture photosensitive medium and at a position required to position a visual image in accordance with the image aperture format and image type positive or negative of the corresponding digital image; and f) responding to the digital image file to activate the two-dimensional optical modulator to provide the visual image which represents the digital image or an image plane of the digital image to be recorded so that the motion picture photosensitive medium will record a selected positive or negative visual image in the appropriate position without reduction of the number of pixels provided by the modulator.

2. The method of claim 1 further including:

g) providing a plurality of two-dimensional optical modulators, each one of which receives information from a color record in the digital image file corresponding to a particular color image plane;

h) each modulator responding to its corresponding color record to produce a visual image to be recorded on and superimposed with the visual images produced by the other modulators; and i) simultaneously and optically combining and focusing the visual images provided by each modulator into a single visual image and recording such visual image onto the photosensitive medium.

3. The method of claim 2 wherein each two-dimensional optical modulator is an LCD.

4. The method of claim 3 further including providing a source of illumination with one or more wavelength of light selected to illuminate a particular LCD modulator in accordance with the sensitivity of the motion picture photosensitive medium and the color records in the digital image file.

5. The method of claim 4 wherein the source of illumination is controlled in a time dependent sequence and duration synchronous with the color records in the digital image file when presented to the LCD modulator.

6. The method of claim 1 wherein the relative motion between the motion picture photosensitive medium and the optical modulator is accomplished by moving the motion picture photosensitive medium.

7. The method of claim 1 wherein the relative motion between the motion picture photosensitive medium and the optical modulator is accomplished by moving the two-dimensional optical modulator.

8. The method of claim 1 wherein the relative motion between the motion picture photosensitive medium and the optical modulator is accomplished by moving both the motion picture photosensitive medium and the optical modulator.

* * * * *